Feb. 4, 1969    R. G. WARD ET AL    3,425,399
STRATIFIED CHARGE GAS ENGINE
Filed May 23, 1966
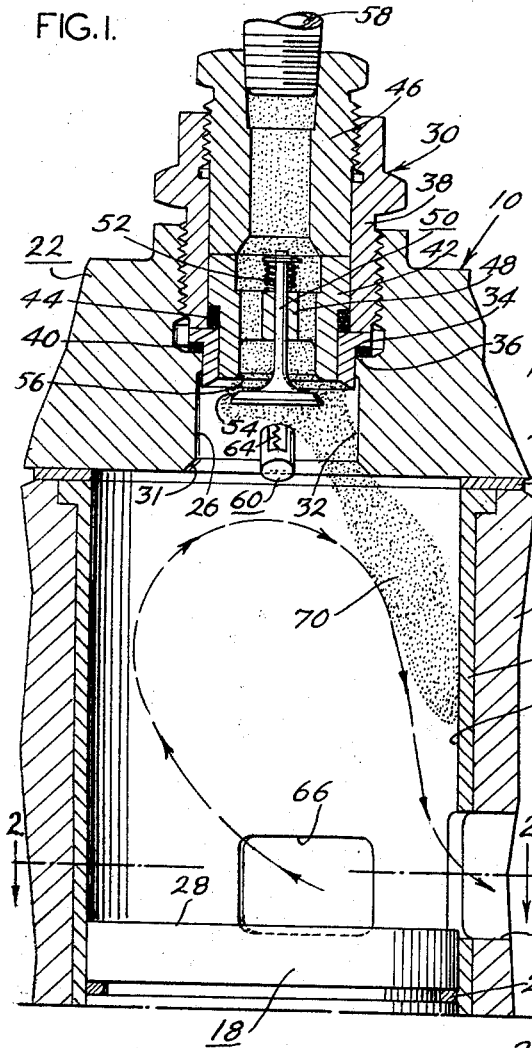
FIG. 1.
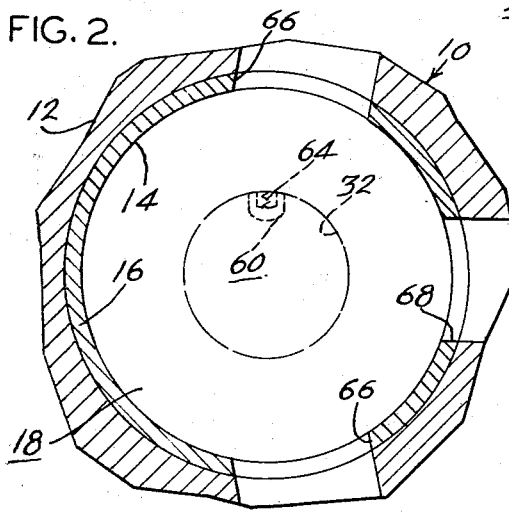
FIG. 2.
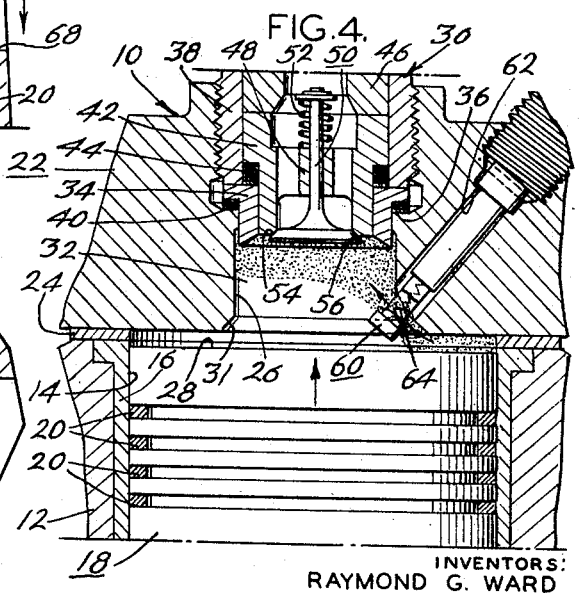
FIG. 3.
FIG. 4.
INVENTORS:
RAYMOND G. WARD
JULIUS E. WITZKY
BY Howson & Howson
ATTYS.

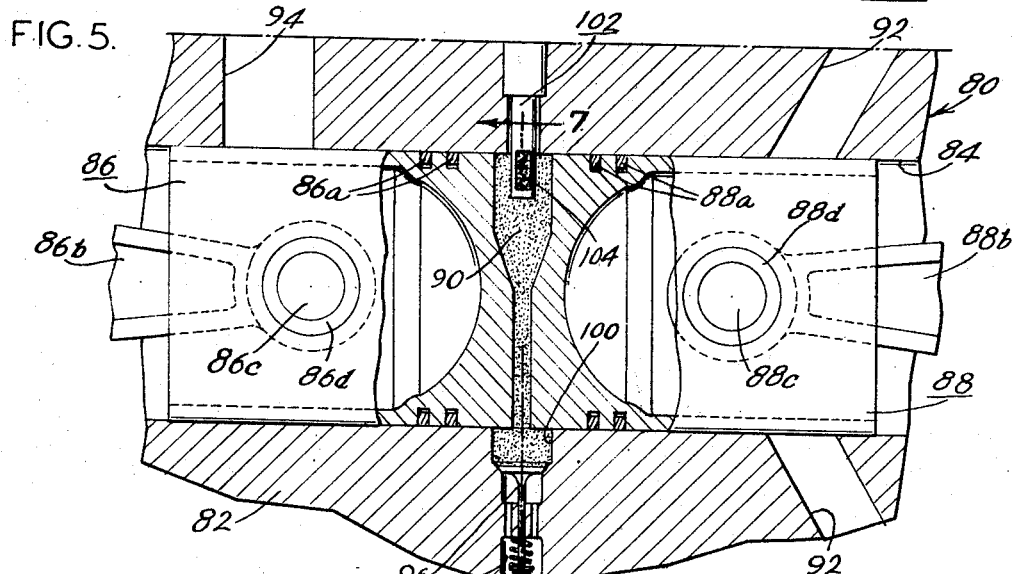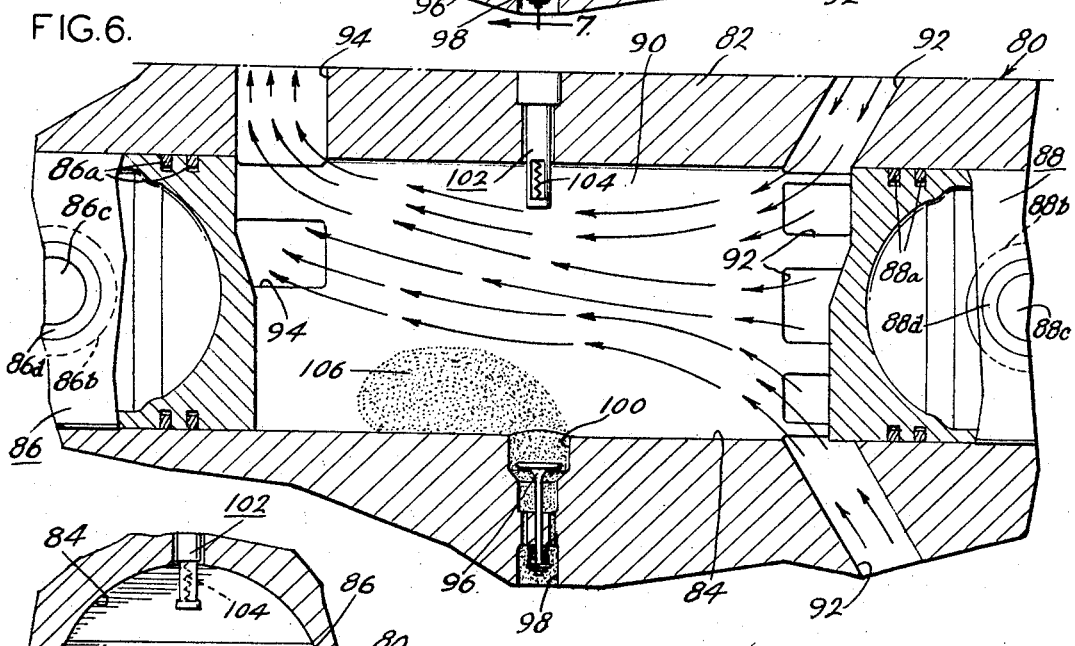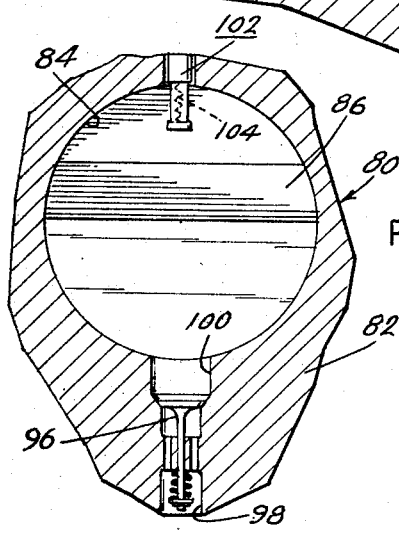

United States Patent Office 3,425,399
Patented Feb. 4, 1969

3,425,399
STRATIFIED CHARGE GAS ENGINE
Raymond G. Ward and Julius E. Witzky, San Antonio, Tex., assignors, by mesne assignments, to American Gas Association, Inc., New York, N.Y., a corporation of New York
Filed May 23, 1966, Ser. No. 552,032
U.S. Cl. 123—32                                                9 Claims
Int. Cl. F02b 9/06, 1/08; F02d 39/04

ABSTRACT OF THE DISCLOSURE

A gaseous fuel internal combustion engine having a check valve connected with a source of gaseous fuel at a low pressure opening into the combustion chamber and adapted to automatically admit fuel to the combustion chamber during scavenging thereof. A glow plug extends into the combustion chamber being positioned with respect to the scavenging air flow substantially parallel with or upstream of the check valve whereby the gaseous fuel charge is moved across the glow plug for ignition during the compression stroke of the engine.

---

The present invention relates generally to internal combuston engines of the type designed to operate on a gaseous fuel which is mixed with air in the engine cylinder to form a combustible mixture. More particularly, the invention relates to a gas engine of a novel design which requires no fuel pumping, fuel injection, or valve opening mechanisms and which does not require the complicated conventional spark ignition system.

The operational concept characterizing the present engine is the introduction of a gaseous fuel to an engine cylinder from a low pressure source through a check valve, which fuel, due to the flow pattern within the cylinder, remains localized in a fuel cloud. Toward the end of the compression stroke, the fuel cloud passes across a strategically located glow plug whereupon ignition of the charge occurs. In the present invention, the path of the fuel cloud during compression of the charge presents a constantly decreasing air/fuel ratio to the glow plug during the compression stroke, the plug being so positioned as to cause ignition of the charge just before the piston reaches top dead center. By use of a properly positioned glow plug, it has been found that dependable engine performance may be achieved without the need for the conventional spark ignition system.

An advantageous feature of the present invention is the use of a simple check valve to regulate the fuel input to the cylinder, the fuel being supplied under a very low pressure and being drawn into the cylinder by the scavenging air flow in a two-cycle engine or the vacuum created on the intake stroke of the piston in a four-cycle engine. Although the invention is illustrated and described in the setting of a two-cycle engine, as will be discussed hereinafter, the same operational concepts can be applied to a four-cycle engine.

It is accordingly a first object of the present invention to provide a novel gaseous fuel engine havinig excellent combustion efficiency characteristics which require no air throttling, fuel mixing or spark ignition systems.

A further object of the present invention is to provide a gas engine as described wherein a pumping or high pressurization of the gaseous fuel is unnecessary and wherein the fuel is admitted to the cylinder by a simple gas pressure actuated check valve.

Another object of the inveintion is to provide a gas engine as described wherein the ignition of the charge is provided by a strategically positioned glow plug.

A still further object of the invention is to provide a gas engine as described of a light-weight, simple design which is economical to manufacture and operate.

Additional objects and advantages of the invention will be more readily apparent from the following detailed description of an embodiment thereof when taken together with the accompanying drawings in which:

FIG. 1 is a sectional elevational view taken through a cylinder of a two-cycle internal combustion engine embodying the present invention showing the piston at the start of the compression stroke;

FIG. 2 is a sectional view taken along line 2—2 of FIG. 1 showing the air intake ports, the exhaust port and the relative position of the glow plug with respect thereto;

FIG. 3 is a view similar to that of FIG. 1 showing the engine at a further stage of the compression stroke;

FIG. 4 is a sectional view similar to those of FIGS. 1 and 3 showing the engine just before the top dead center piston position and illustrating the passage of the fuel cloud across the glow plug;

FIG. 5 is a sectional view showing a further embodiment of the invention applied to an opposed piston uniflow-scavenged engine, the engine being shown just prior to ignition;

FIG. 6 is a view similar to that of FIG. 5 showing the engine during the scavenging phase of the cycle; and FIG. 7 is a sectional view taken along line 7—7 of FIG. 5 showing the relationship of the glow plug and check valve in the combustion chamber.

Referring to the drawings, an engine generally designated 10 embodying the present invention comprises a cylinder block 12 having a cylinder 14 therein and including a cylinder liner 16. A piston 18 having piston rings 20 is adapted for reciprocating movement within the cylinder 14 and is connected in a conventional manner to a crankshaft for delivery of power from the engine. A cylinder head 22 is bolted to the cylinder block, being sealed thereupon by the gasket 24. A combustion chamber 26 is thus formed by the cylinder head 22, gasket 24, cylinder liner 16 and the upper surface 28 of the piston. A fuel intake check valve assembly 30 is mounted in the cylinder head 22 coaxial with the cylinder 14.

Considering the combustion chamber and check valve assembly in detail, the cylinder head 22 includes a cylindrical gas chamber 32 opening into and coaxial with the engine cylinder, the lower annular edge of the gas chamber being beveled as shown at 31 to facilitate fluid flow to and from the chamber. The check valve assembly extends into the upper end of the gas chamber and includes a flanged seat ring 34 which is supported by an annular shoulder 36 of the cylinder head. A hollow seat ring retaining nut 38 is threadedly mounted in the cylinder head and is adapted, in conjunction with the resilient seal ring 40, to seal the seat ring 34 against the shoulder 36. Fitted within the respective bores of the seat ring 34 and the retaining nut 38 is the shouldered valve guide element 42 which is urged against the seal ring 44 on the seat ring 34 by the hollow retaining nut 46. A central spider 48 of the valve guide element 42 slidably supports a coaxial check valve 50 which is spring loaded by compression spring 52 to urge the valve face 54 toward the valve seat 56 of the guide element 42 as shown in FIGS. 3 and 4. A fuel conduit 58 is connected with the bore of the hollow retaining nut 46, through which gaseous fuel travels from a low pressure source into the hollow valve guide element 42 and, when the check valve 50 is open as shown in FIG. 1, into the gas chamber 32 of the cylinder head.

A glow plug 60 is threadedly seated in the cylinder head as shown in FIG. 4, the plug extending into the combustion chamber through the inclined bore 62 in the cylinder head. The glow plug need not be inclined as illustrated, it being important only that the glow plug wire 64 extend into the lower region of the gas chamber 32. The glow plug is connected to a suitable source of current (not shown) which is utilized to heat the plug only during starting of the engine. After the engine is in operation. the heat of combustion keeps the glow plug wire in a glowing condition.

Inasmuch as the illustrated engine is a two-cycle engine, the air intake ports 66 and the exhaust port 68 are located in the walls of the cylinder in a manner conventional to crankcase scavenged engines. The intake and exhaust port arrangement illustrated is that of a cross-loop scavenged engine wherein the air intake ports are disposed at approximately 80° to each side of the exhaust port as shown in FIG. 2. With such a system, it is important that the angular position of the glow plug with respect to the exhaust port be approximately 90° as illustrated in FIG. 2, the reason for this placement becoming apparent from the following description of the operation of the engine.

For operation, the conduit 58 is connected to a source of suitable gaseous fuel such as natural gas, methane, propane or butane, which should be delivered under a low pressure, preferably below 5 p.s.i. Air under pressure is presented to the intake ports 66 for scavenging the cylinder. The glow plug 60 is heated for starting the engine by passage of current through the wire 64.

During engine operation, as the piston descends following ignition and expansion of the stratified charge, the exhaust port 68 is opened followed shortly by the intake port 66 thus permitting a scavenging flow of air to enter the cylinder in the manner shown in FIG. 1, the air from the inlet ports looping upwardly in an aspirating flow across the gas chamber 32, allowing the check valve 50 to open by the action of the gas pressure and drawing a cloud of gaseous fuel into the combustion chamber while the combustion products are forced out through the exhaust port 68. The looping air flow draws the cloud of gaseous fuel downwardly along the wall of the cylinder above the exhaust port, the fuel remaining localized in this region as shown at 70 in FIG. 1.

As the piston moves upwardly closing the exhaust and intake ports as shown in FIG. 3, the scavenging air flow is halted and the check valve 50 is closed by the spring 52 and the increasing cylinder pressure to seal the combustion chamber. The continuing piston movement compresses the air and gaseous fuel trapped in the cylinder and the fuel cloud moves upwardly toward the gas chamber 32 as shown in FIG. 3. As the piston nears the top of its stroke, the fuel cloud is moved into the chamber 30 and in so doing moves across the wire 64 of the glow plug 60. Because of the positioning of the glow plug at approximately 90° from the exhaust port over which the fuel cloud gathers, at the beginning of the compression stroke the glow plug region is relatively free of the gaseous charge. As the compression stroke nears completion, however, the charge moves toward and through the glow plug so that an increasingly richer fuel mixture is presented to the wire 64. When the critical mixture is presented to the plug, ignition of the fuel cloud occurs which ignites the remainder of the charge in the combustion chamber, the expansion of the burning charge powering the piston on its downward stroke.

The above described explanation of the mode of operation of the engine and particularly the path of the fuel cloud is, to a degree, theoretical since the exact conditions in the engine during its operation cannot be accurately determined. However, experiments have been made wherein the angular position of the glow plug with respect to the exhaust port has been varied and it is based largely on the observations of engine operation during such experiments that the above theory has evolved.

With the glow plug positioned directly over the exhaust port, operation of the engine was difficult and, at best spasmodic. This was attributed to the continuous presence of the fuel cloud about the glow plug wire, thus exposing the plug during the critical phase of the compression stroke to an unvarying, extremely rich air/fuel mixture which would not readily ignite. Tests were also run with the glow plug positioned at 180° to the exhaust port and in such tests the ignition took place too late to provide effective engine power. This can be explained by the time lapse required for the fuel cloud to advance to the far side of the gas chamber. The most efficient operation of the engine was found to result from the positioning of the glow plug at approximately 90° to the plane of movement of the fuel cloud so that, upon compression of the engine, the fuel cloud would pass in increasing density across the glow plug wire.

The amount of fuel entering the engine and hence the engine speed and power, can be controlled by regulating the pressure of the fuel entering the engine through the conduit 58. The engine is best suited, however, for constant speed and essentially constant load applications.

The glow plug requires external heating only for starting the engine and thereafter operates on the engine combustion heat, thereby eliminating the spark plug and complicated ignition system typical of conventional engines. Recent advances in glow plug design utilizing the unusual heat resistance properties of platinum-rhodium and platinum-tungsten alloys permit the sustained use of a glow plug opennig directly into the engine combustion chamber in the manner of the presently illustrated embodiment.

A further embodiment of the invention is illustrated in FIGS. 5–7 wherein an opposed piston uniflow type engine generally designated 80 is shown comprising a cylinder block 82 having a horizontal cylinder 84 therein which is fitted with opposed pistons 86 and 88 having piston rings 86a and 88a. The pistons are connected in a conventional manner to opposed crankshafts (not shown) by means of connecting rods 86b and 88b pivotally attached thereto by the wrist pins 86c and 88c in bushings 86d and 88d. The cylinder 84 and the pistons 86 and 88 define a combustion chamber 90 into the opposed ends of which, when the pistons approach their bottom dead center position as shown in FIG. 6, open the air intake ports 92 and the exhaust ports 94.

Communicating with the combustion chamber and aligned with the transverse center line of the engine is the spring loaded fuel check valve 96. The check valve is connected at 98 to a source of gaseous fuel under low pressure and opens into a cylindrical gas chamber 100 which, in turn, opens into the cylinder 84. Diametrically opposed from the check valve 96 is a glow plug 102 having a wire element 104 extending into the combustion chamber 90 along the transverse center line of the engine.

The operation of this embodiment is quite similar to that described above in that during the scavenging flow of air from the air intake ports 92 to the exhaust ports 94, the check valve 96 is opened by the aspirating effect of the flow to admit a fuel cloud 106 into the combustion chamber. Due to the admission of the fuel cloud at one side of the air flow, the cloud remains localized at one side of the cylinder so that, upon compression of the stratified charge, the fuel cloud is moved toward and across the wire 104 of the glow plug permitting ignition to occur as the critical air/fuel mixture is presented to the wire. The ignition of the remaining charge is then consummated and the energy released by the burning charge propels the pistons apart to rotate the crankshafts in the conventional manner. The opposed faces of the pistons are relieved in the area of the glow plug to facilitate the movement of the charge into and through the glow plug region.

In the uniflow engine illustrated, the exhaust ports 94 extend only around the 180° of the cylinder opposed from the fuel check valve to prevent the disturbance of the fuel cloud by the exhaust flow through the ports. Although such a construction is desirable, it is not deemed essential and the engine could function effectively with the conventional 360° exhaust porting.

The present invention can be utilized with other types of scavenging arrangements and also with a four-cycle engine. The important concept which should characterize each such embodiment is the positioning of the glow plug with respect to the fuel cloud such that the cloud passes through the glow plug to vary the density of the fuel charge during the critical period during which ignition is to be initiated, just before the piston reaches top dead center.

The present invention is particularly adapted for small air-cooled single cylinder two-cycle engines although there would appear to be no limitations on the permissible size range of the engine embodiments. The unique absence of a carburetor or gas mixing valve, and of a spark ignition system without affecting fuel economy are the attractive features of this invention. Not only is the initial cost of the engine substantially lower than a conventional engine of comparable size, but the maintenance costs as well are substantialy reduced. The two primary sources of engine trouble, the ignition system and the valves, are eliminated in the two-cycle crankcase-scavenged embodiment.

Manifestly, changes in details of construction can be effected by those skilled in the art without departing from the spirit and the scope of the invention as defined in and limited solely by the appended claims.

We claim:

1. An internal combustion engine comprising cylinder and piston means defining a combustion chamber, scavenging means in said cylinder and piston means for charging said combustion chamber with air and discharging products of combustion therefrom, a gas chamber opening into a region of said combustion chamber substantially perpendicular to the scavenging air flow in said region, a check valve opening into said gas chamber and connected with a source of gaseous fuel, said check valve being adapted to be opened during scavenging of said combuston chamber by the difference in pressure between fuel supply and the scavenging air flow passing across said gas chamber to admit a localized fuel cloud along one side of said combustion chamber, and a glow plug extending into said combustion chamber, said glow plug being positioned substantially along or upstream of a plane extending through the check valve perpendicular to the scavenging air flow adjacent the check valve whereby movement of the piston during the compression stroke by compression of the cylinder air and fuel charge moves the fuel cloud across said glow plug for ignition thereby.

2. An internal combustion engine comprising a cylinder, a piston slidably disposed in said cylinder in sealing relation therewith, a cylinder head mounted on said cylinder and defining a combustion chamber in said cylinder for charging sadi combustion chamber wtih iar and discharging the products of combustion therefrom, a gas chamber in said cylinder head coaxial with and opening into said cylinder, a coaxial check valve opening into said gas chamber and connected with a source of gaseous fuel at low pressure, said scavenging means being adapted to provide a loop of scavenging air across said gas chamber to create an aspirating effect thereby opening said check valve and drawing a cloud of gaseous fuel into a localized region along one side of said combustion chamber, and a glow plug extending into said combustion chamber, said glow plug being positioned substantially along or upstream of a plane extending through the check valve perpendicular to the scavenging air flow adjacent the check valve whereby movement of the piston during the compression stroke by compression of the cylinder air and fuel charge moves the fuel cloud across said glow plug for ignition thereby.

3. The invention as claimed in claim 2 wherein said glow plug is positioned substantially along a plane extending through said check valve and at 90° with respect to the scavenging air flow adjacent the check valve.

4. An internal combustion engine comprising a cylinder, opposed pistons slidably disposed in said cylinder in sealing relation therewith, said pistons defining a combustion chamber in said cylinder, scavenging means in said cylinder for charging said combustion chamber with air and discharging the products of combustion therefrom, a check valve communicating with said combustion chamber connected with a low pressure source of gaseous fuel, said scavenging means being adapted to provide a flow of scavenging air in the vicinity of said check valve allowing the admission of a fuel cloud therefrom into a localized region along one side of said combustion chamber, and a glow plug extending into said combustion chamber, said glow plug being positioned substantially along or upstream of a plane extending through the check valve perpendicular to the scavenging air flow adjacent the check valve whereby movement of the fuel cloud during compression of the charge provides a passage of the fuel cloud across said glow plug for ignition thereby.

5. The invention as claimed in claim 4 wherein said check valve and said glow plug are aligned with the transverse center line of said engine and are positioned at opposite sides of said cylinder.

6. The invention as claimed in claim 5 wherein said check valve opens into a gas chamber which in turn opens into said combustion chamber.

7. The invention as claimed in claim 5 wherein the faces of said pistons are relieved adjacent said glow plug to facilitate the movement of the fuel cloud into and through the glow plug region.

8. An internal combustion engine comprising piston and cylinder means defining a combustion chamber, scavenging means in said cylinder and piston means for charging said combustion chamber with air and discharging the products of combustion therefrom, a check valve communicating with said combustion chamber connected with a source of gaseous fuel at a low pressure and adapted responsive to a pressure drop in said cylinder to automatically admit fuel to said combustion chamber during scavenging thereof, said check valve being positioned adjacent the flow path of the scavenging air whereby fuel at slight pressure is admitted to the cylinder from said valve into the path of the scavenging air flow and is localized in a fuel cloud along one side of sad combustion chamber, and a glow plug extending into said combustion chamber, said glow plug being positioned substantially along or upstream of a plane extending through the check valve perpendicular to the scavenging air flow adjacent the check valve whereby movement of the piston during the compression stroke by compression of the cylinder air and fuel charge moves the fuel cloud across said glow plug for ignition thereby.

9. An internal combustion engine as claimed in claim 8, wherein said glow plug is positioned substantially along a plane extending through said check valve and at 90° with respect to the scavenging air flow adjacent the check valve.

References Cited

UNITED STATES PATENTS

| | | | |
|---|---|---|---|
| 2,140,503 | 12/1938 | Beckman | 123—51 |
| 2,249,354 | 7/1941 | Gehres | 123—65 |
| 2,667,155 | 1/1954 | Paluch et al. | 123—65 |
| 2,762,351 | 9/1956 | Canoose | 123—27 |
| 2,763,248 | 9/1956 | Green et al. | 123—65 |
| 2,799,255 | 7/1957 | Gehres | 123—1 |
| 2,792,817 | 5/1957 | Smith | 123—65 |
| 2,805,654 | 9/1957 | Jacklin | 123—51 |
| 2,914,041 | 11/1959 | Froehlich | 123—1 |
| 3,062,198 | 11/1962 | Richardson | 123—1 |

LAURENCE M. GOODRIDGE, *Primary Examiner.*

U.S. Cl. X.R.
123—27, 65, 69, 120

PO-1050
(5/69)

UNITED STATES PATENT OFFICE
CERTIFICATE OF CORRECTION

Patent No. 3,425,399         Dated Feb. 4, 1969

Inventor(s) Raymond G. Ward and Julius E. Witzky

It is certified that error appears in the above-identified patent and that said Letters Patent are hereby corrected as shown below:

Column 1, line 60, "havinig" should be --having--.
Column 4, line 16, "heatiling" should be --heating--;
         line 23, "opennig" should be --opening--.
Column 5, line 49, after "cylinder" insert --in conjunction with said piston, scavenging means in said cylinder--;
         line 50, "sadi" should be --said--;
         same line, "wtih" should be --with--;
         same line, "iar" should be --air--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents